United States Patent
Dobre et al.

(10) Patent No.: US 10,547,458 B2
(45) Date of Patent: Jan. 28, 2020

(54) MANAGING AND NEGOTIATING CERTIFICATES

(71) Applicant: Adobe Inc., San Jose, CA (US)

(72) Inventors: Alexandru-Cristian Dobre, Tecuci (RO); Raluca Voinescu, Bucharest (RO); Paul Alexandru Chirita, Bucharest (RO); Edvin Ali, Medgidia (RO); Bogdan Ionita, Ploiesti (RO); Andrei-Valentin Duca, Bucharest (RO)

(73) Assignee: Adobe Inc., San Jose, CA (US)

( * ) Notice: Subject to any disclaimer, the term of this patent is extended or adjusted under 35 U.S.C. 154(b) by 201 days.

(21) Appl. No.: 15/890,150

(22) Filed: Feb. 6, 2018

(65) Prior Publication Data
US 2019/0245700 A1  Aug. 8, 2019

(51) Int. Cl.
*H04L 29/06* (2006.01)
*H04L 9/32* (2006.01)
*H04L 29/08* (2006.01)

(52) U.S. Cl.
CPC .......... *H04L 9/3268* (2013.01); *H04L 9/321* (2013.01); *H04L 67/1097* (2013.01); *H04L 67/2842* (2013.01)

(58) Field of Classification Search
USPC .......................................................... 713/156
See application file for complete search history.

(56) References Cited

U.S. PATENT DOCUMENTS

| | | | | |
|---|---|---|---|---|
| 7,634,811 B1* | 12/2009 | Kienzle | ................. | G06F 21/33 726/22 |
| 7,904,951 B1* | 3/2011 | Ebrahimi | ............ | H04L 63/0823 713/153 |
| 8,566,580 B2* | 10/2013 | Ben-Itzhak | ......... | H04L 63/0823 713/156 |
| 8,627,063 B2* | 1/2014 | Edstrom | ............. | H04L 63/0823 713/151 |

(Continued)

OTHER PUBLICATIONS

"Bind an existing custom SSL certificate to Azure Web Apps", Retrieved at: https://docs.microsoft.com/en-us/azure/app-service/app-service-web-tutorial-custom-ssl—on Nov. 2, 2017, Jun. 23, 2017, 13 pages.

(Continued)

*Primary Examiner* — Amare F Tabor
(74) *Attorney, Agent, or Firm* — SBMC

(57) ABSTRACT

Systems and techniques are described herein for managing and negotiating SSL certificates as part of a handshake between a client computing device and a website hosting infrastructure. Certificates for a website are stored in a common storage and are lazy-loaded into cache memory when the website is requested by a client. Certificates are served by the hosting infrastructure responsive to a handshake request from a client by determining if a certificate for a hostname in the handshake request is in cache memory. When available, a cached certificate is served. When a cached certificate for the hostname is unavailable, a certificate is retrieved from the common storage, placed in cache memory, and served. OCSP stapling data is lazy-loaded and (Continued)

served also from the cache memory. Hence, a certificate is available immediately upon deployment, without costly reconfiguration of the hosting platform to accommodate new certificates and new hostnames.

20 Claims, 6 Drawing Sheets

(56) References Cited

U.S. PATENT DOCUMENTS

| | | | | |
|---|---|---|---|---|
| 9,203,627 | B2 * | 12/2015 | Edstrom | H04L 63/0823 |
| 9,507,859 | B1 * | 11/2016 | Roskind | H04L 9/3268 |
| 9,525,680 | B2 * | 12/2016 | Ben-Itzhak | H04L 63/0823 |
| 2017/0149571 | A1 * | 5/2017 | Sun | H04L 63/045 |
| 2017/0223054 | A1 * | 8/2017 | Wing | H04L 63/166 |
| 2019/0190961 | A1 * | 6/2019 | McGrew | H04L 63/306 |

OTHER PUBLICATIONS

"Using Multiple SSL Certificates in Apache with One IP Address", Retrieved at: https://www.digicert.com/ssl-support/apache-multiple-ssl-certificates-using-sni.htm—on Nov. 2, 2017, 3 pages.
"SSL Offloading Service for Multiple Domains on the Same Virtual Using Server Name Indication (SNI)", Retrieved at: https://support.radware.com/app/answers/answer_view/a_id/16135/~/ssl-offloading-service-for-multiple-domains-on-the-same-virtual-ip-using-server#—on Nov. 6, 2017, Nov. 2, 2016, 3 pages.
"Heroku SSL | Heroku Dev Center", Retrieved at: https://devcenter.heroku.com/articles/ssl—on Nov. 6, 2017, 5 pages.
"Amazon CloudFront Custom SSL—Amazon Web Services", Retrieved at: https://aws.amazon.com/cloudfront/custom-ssl-domains/—on Nov. 2, 2017, 6 pages.
"How to configure multiple SSL certificates on a single Host Port (SNI)", Retrieved at: https://www.wowza.com/docs/how-to-configure-multiple-ssl-certificates-per-domain-on-a-single-host-port-sni, 6 pages.
"Mapping Custom Domains", Retrieved at: https://cloud.google.com/appengine/docs/standard/python/mapping-custom-domains—on Nov. 6, 2017, 8 pages.
"The SNI Feature of NetScaler Appliance", Retrieved at: https://support.citrix.com/article/CTX125798—on Nov. 2, 2017, 8 pages.
Assmann, "Enhanced SSL Load-balancing with Server Name Indication (SNI) TLS Extension", Retrieved at: https://www.haproxy.com/blog/enhanced-ssl-load-balancing-with-server-name-indication-sni-tls-extension/—on Nov. 2, 2017, 04/13/212, 11 pages.
Holmes, "F5 SSL Everywhere", Retrieved at: https://f5.com/Portals/1/Premium/Architectures/RA-SSL-Everywhere-deployment-guide.pdf—on Nov. 2, 2017, 53 pages.
Wagnon, "SSL Profiles Part 7: Server Name Indication", Retrieved at: https://devcentral.f5.com/articles/ssl-profiles-part-7-server-name-indication—on Nov. 2, 2017, Mar. 1, 2017, 8 pages.

* cited by examiner

MANAGING AND NEGOTIATING CERTIFICATES

BACKGROUND

A large portion of global commerce is done electronically over the Internet. To accommodate such electronic commerce (e-commerce), hosting infrastructures may host millions of websites. When a client (e.g., an end-user) accesses a website, such as with a web browser on a client computing device, the hosting infrastructure serves a certificate for the website to the client as part of a handshake of a security protocol. For instance, the security protocol may be a Secure Sockets Layer (SSL) protocol, and the certificate may be a SSL certificate. SSL certificates provide secure, encrypted communications between a website and a client, and are typically used by websites that require clients to submit sensitive information, such as a credit card number, password, social security number, and the like.

Most hosting infrastructures are multi-tenant, hosting multiple websites on a same Internet Protocol (IP) address. Accordingly, instead of attaching a SSL certificate to an IP address as can be done for a SSL protocol, a hosting infrastructure may attach a SSL certificate to a hostname indicated by a client's web browser based on a Server Name Indication (SNI) protocol. SNI protocol allows a client to include a requested hostname for a website in a first message of a SSL handshake. Consequently, a hosting infrastructure may serve multiple SSL certificates each attached to different hostnames for websites hosted on a same IP address, without requiring the websites to share a common certificate.

An owner of a website (e.g., a business owner) can request that a certificate be generated by a certificate authority (e.g., a public or private third party to the owner and hosting infrastructure) at any time. When a certificate is generated by a certificate authority for a website, the hosting infrastructure that hosts the website must ensure its hosting platform (e.g., load balancers and servers) is configured for the newly-generated certificate. Many hosting infrastructures host multiple websites by using virtual hosts. For instance, one virtual host is implemented for each hostname. For these hosting infrastructures to accommodate a newly-generated certificate, their hosting platform must be reconfigured for the newly-generated certificate, which requires significant effort. For instance, (i) a new virtual host must be installed, (ii) the newly-generated certificate must be mapped to the new virtual host, and (iii) a new configuration with the new mapping must be reloaded for all existing load balancers and made available to new load balancers if they are added for auto-scaling. Consequently, hosting infrastructures implementing a respective virtual host for each hostname, or any hosting infrastructures requiring a complicated certificate installation process in which a newly-generated certificate requires reconfiguration of load balancers or servers, are not well suited to scaling in terms of numbers of hosted websites.

SUMMARY

Techniques and systems are described to manage and negotiate certificates (e.g., SSL certificates). Once generated by a certificate authority, a certificate for a website is stored in a common storage (e.g., an encrypted network storage) that is accessible to a hosting infrastructure of the website. When a handshake request (e.g., a "hello" message) from a client is received by load balancers of the hosting infrastructure, a certificate management system of the hosting infrastructure determines a certificate to serve to the client and negotiate (e.g., complete) the handshake request based on a lazy-loading of certificates. For instance, when SNI is not supported and the handshake request does not include a hostname, a default certificate is served. Otherwise, when SNI is supported and the handshake request does include a hostname, to improve handshake speed, a certificate for the hostname is obtained from cache memory if a cached certificate is available in the cache memory. If unavailable in cache memory, the certificate is obtained from the common storage (e.g., an encrypted network storage) and placed in cache memory so it is available for a next handshake request that includes the hostname. A time-to-live value is assigned to each object in the cache memory, which also implements a least-recently-used eviction algorithm for certificates in the cache memory. Hence, the certificate management system of the hosting infrastructure implements a lazy-loading of the certificates that always serves a latest version of the certificate. Furthermore, the certificate management system implements Online Certificate Status Protocol (OCSP) stapling in which status protocol data (e.g., including a revocation status of a certificate) is also lazy-loaded and served with SSL certificates. By implementing the certificate management system at load balancers of the hosting infrastructure (e.g., layer-7 load balancers), the load balancers can not only serve an appropriate SSL certificate based on the lazy-loading, but also decrypt content using the SSL certificate and make content switching decisions (e.g., assign appropriate servers) based on the content, improving efficiency of the hosting infrastructure.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
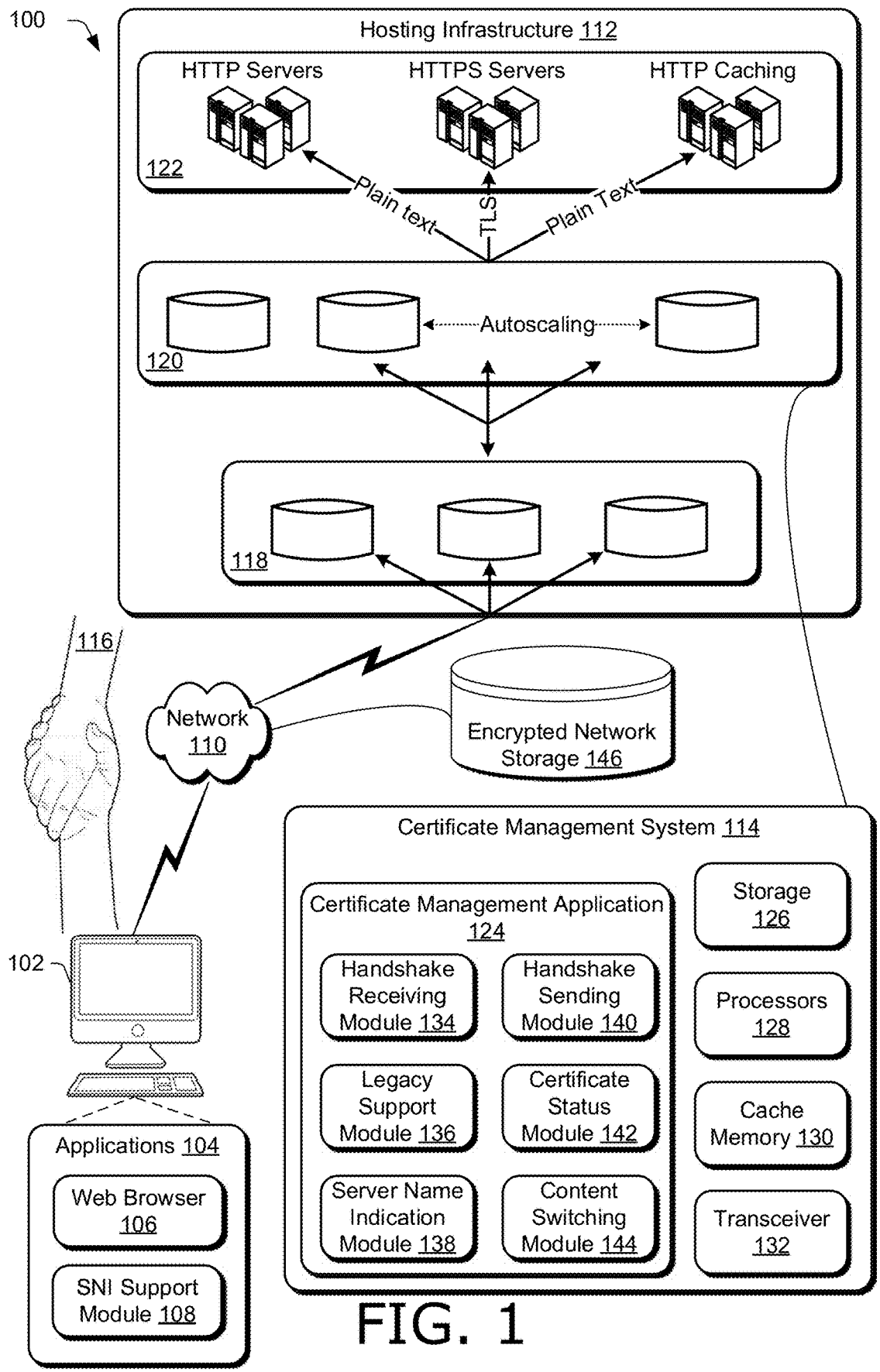
FIG. 1 illustrates a digital medium environment in an example implementation that is operable to employ techniques described herein.

When a client (e.g., an end-user) accesses a website, such as with a web browser on a client computing device, a hosting infrastructure serves a certificate for the website to the client as part of a handshake of a security protocol. In one example, the security protocol is a SSL protocol, and the certificate is a SSL certificate. Furthermore, to support a SNI protocol, a hosting infrastructure may attach a SSL certificate to a hostname indicated by a client's web browser in a handshake request. Consequently, a hosting structure may serve multiple SSL certificates each attached to different hostnames for websites hosted on a same IP address, without requiring the websites to share a common certificate. It is not uncommon for a hosting infrastructure to host millions of websites, so that the manner in which SSL certificates are managed and negotiated (e.g., served to clients) can impact a level of effort needed to maintain the hosting infrastructure, such as by a system administrator of the hosting infrastructure, as well as impact the end-user experience (e.g., by adding delay).

Many hosting infrastructures host multiple websites by implementing a respective virtual host for each hostname When a certificate is generated by a certificate authority for a website hosted by these types of hosting infrastructures, their hosting platform (e.g., load balancers and servers) must be reconfigured for the newly-generated certificate, requiring: (i) a new virtual host must be installed, (ii), the newly-generated certificate must be mapped to the new virtual host, and (iii) a new configuration with the new mapping must be reloaded for all existing load balancers and made available to new load balancers if they are added. Consequently, hosting infrastructures implementing a respective virtual host for each hostname are not well suited to scaling in terms of numbers of hosted websites, requiring significant effort to accommodate more or less hosted websites.

Accordingly, this disclosure describes systems and techniques for managing and negotiating certificates (e.g., SSL certificates) by lazy-loading the certificates into memory so that a new hostname can be accommodated on-the-fly, without reconfiguring load balancers or a hosting platform. A newly-generated certificate is stored on an encrypted network storage accessible to a hosting infrastructure. The newly-generated certificate may be generated by a certificate authority for an existing website hosted by the hosting infrastructure or a new website to be hosted by the hosting infrastructure. When a client (e.g., an end-user) requests access to a website hosted by the hosting infrastructure, such as by including a hostname for the website in a handshake request to the hosting infrastructure, a certificate for the hostname is lazy-loaded by obtaining the certificate from cache memory if the certificate is available in the cache memory. Otherwise, if a certificate for the hostname is not available in cache memory, the certificate is obtained from the encrypted network storage and placed into cache memory. A time-to-live value is assigned to each object (e.g., certificate) in the cache memory. The handshake request is negotiated by serving (e.g., sending) the certificate to the client. Hence, a latest version of the certificate is efficiently provided to the client without costly reconfiguring of the hosting platform.

Furthermore, status protocol data (e.g., OCSP stapling data) that indicates a revocation status of a certificate is also lazy-loaded and served together with a SSL certificate to the client, without requiring the client to request the status protocol data directly from a certificate authority. Thus, by acting as a proxy for the certificate authority, the hosting infrastructure provides the status protocol data to the client with less delay to the client, without requiring the client web browser to expose data in a separate request to the certificate authority.

Moreover, by implementing the systems and techniques described herein at load balancers of the hosting infrastructure (e.g., layer-7 load balancers), termination of SSL certificates is managed at the load balancers, rather than by servers coupled to the load balancers. Consequently, the load balancers can not only serve an appropriate certificate based on the lazy-loading, but also decrypt content using the certificate and make content switching decisions based on the content. Thus, content switching tasks can be relieved from servers coupled to the load balancers, and instead implemented by the load balancers. Accordingly, auto-scaling of servers becomes much easier, as the servers are viewed as disposable resources.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes computing device 102 (e.g., a client or end-user device). Computing device 102 is depicted in FIG. 1 as a desktop computer as an example, and can be any suitable computing device, such as a mobile phone, tablet, laptop computer, desktop computer, gaming device, goggles, glasses, camera, digital assistant, echo device, navigation device, home appliance, copier, scanner, test and measurement equipment, vehicle computing system, and the like. Hence, computing device 102 may range from a full resource device with substantial memory and processor resources (e.g., personal computers, game consoles) to a low-resource device with limited memory or processing resources (e.g., mobile devices).

Various types of input devices and input instrumentalities can be used to provide input to computing device 102. For example, computing device 102 can recognize input as being a mouse input, stylus input, touch input, input provided through a natural user interface, and the like. Thus, computing device 102 can recognize multiple types of gestures including touch gestures and gestures provided through a natural user interface. In one example, computing device 102 include speech recognition, identification, and synthesis functionalities, microphones, and speakers that allow computing device 102 to communicate with a user in a conversation, e.g., a user conversation. For instance, a user may speak a request to access a website, and cause a handshake request to be sent to the website.

Figure 6:
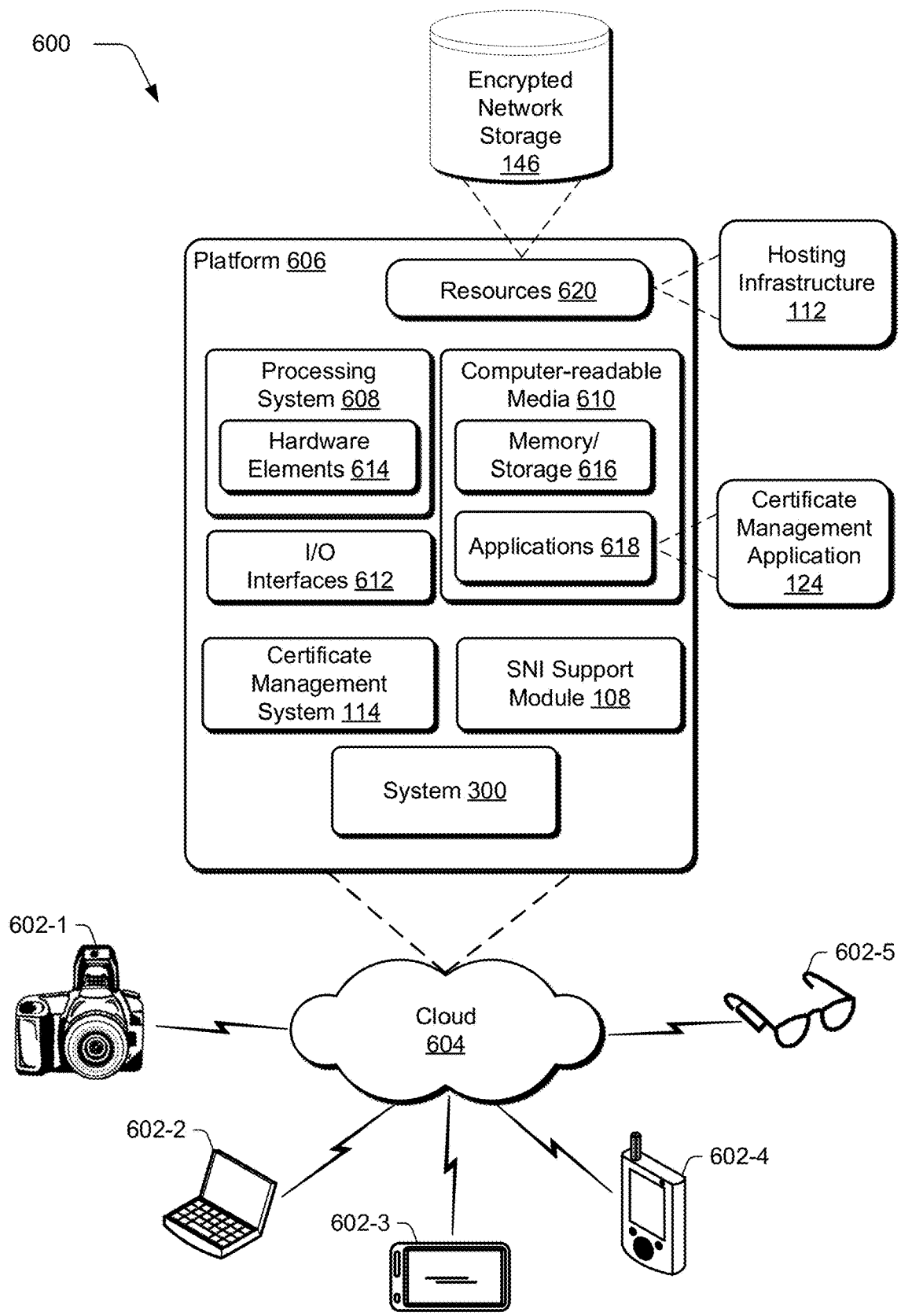
FIG. 6 illustrates an example system including various components of an example device that can be implemented as any type of computing device as described and/or utilized with reference to FIGS. 1-5 to implement aspects of the techniques described herein.

Furthermore, computing device 102 may be representative of one or a plurality of different devices, such as one or more devices connected to a network that perform operations "over the cloud" as further described in relation to FIG. 6. In one example, computing device 102 includes a plurality of computing devices communicatively coupled to each other, such as with a low power wireless communication standard (e.g., a Bluetooth® protocol).

Figure 2:
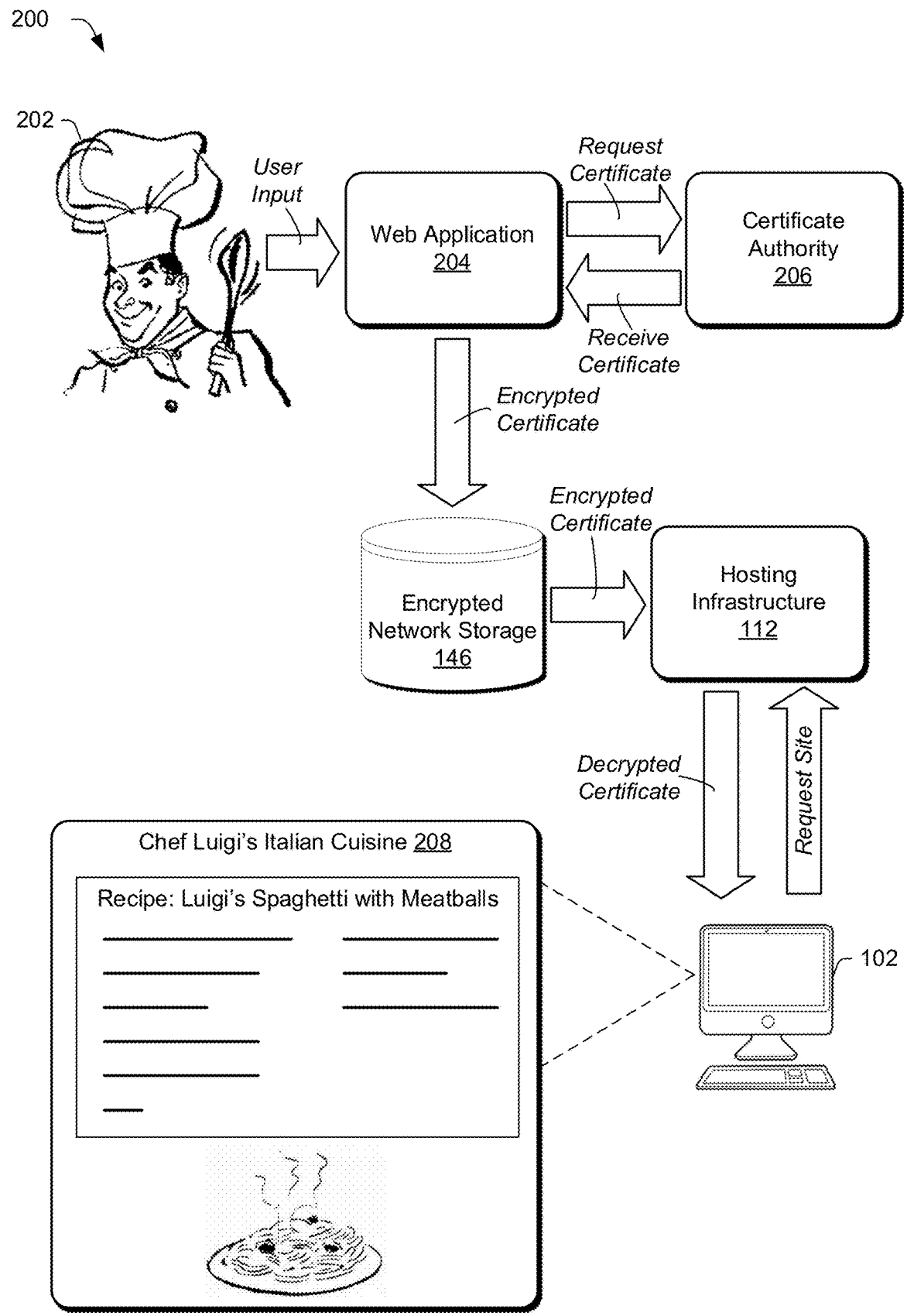
FIG. 2 illustrates an example data flow diagram for the environment in FIG. 1 in accordance with one or more aspects of the disclosure.

In the example illustrated in FIG. 2, computing device 102 includes applications 104. Applications 104 can include any suitable applications installed on or accessible by computing device 102, such as web browser 106 and SNI support module 108. Web browser 106 can be any suitable web browser configured to access content (e.g., web content), via network 110. SNI support module 108 is representative of functionality configured to support a SNI protocol, in which a hostname is included in a handshake request. In one example, SNI support module 108 is a plug-in module to web browser 106. SNI support module 108 configures web browser 106 to include a hostname of a website in a handshake request when computing device 102 is attempting to access the website (e.g., by viewing a webpage of the website). The handshake request can be any suitable type of handshake, such as a SSL handshake as part of a SSL protocol, negotiated between computing device 102 and hosting infrastructure 112 over network 110.

In the example in FIG. 1, computing device 102 requests content on a website hosted by hosting infrastructure 112, such as with web browser 106 over network 110. Hosting infrastructure 112 uses certificate management system 114 to negotiate a handshake (e.g., a SSL handshake), illustrated conceptually by handshake 116, between computing device 102 and hosting infrastructure 112. As part of handshake 116, hosting infrastructure 112 serves a certificate (e.g., SSL certificate) to web browser 106 on computing device 102, which uses the certificate to authenticate itself to hosting infrastructure 112.

Network 110 communicatively couples computing device 102 with hosting infrastructure 112. Network 110 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Hosting infrastructure 112 includes a hosting platform (e.g., servers and load balancers) for hosting a plurality of websites each having a respective hostname. A hostname can be aby suitable hostname for a website. In one example, exampleSite.net is both a hostname and domain name for a website. Additionally or alternatively, serverName.exampleSite.net is a hostname for a website, where serverName is a local hostname and exampleSite.net is a domain name.

Hosting infrastructure 112 includes load balancer 118, load balancer 120, and servers 122. For simplicity, discussion of hosting infrastructure 112 is limited to these components. However, hosting infrastructure 112 can include any suitable components for managing and negotiating SSL certificates, such as routers, power supplies, amplifiers, and the like, not shown in FIG. 1.

Load balancer 118 can be any suitable load balancer. In one example, load balancer 118 is a layer-4 load balancer, and operates at a transport layer according to Transmission Control Protocol (TCP). For instance, load balancer 118 can make routing decisions by inspecting TCP packets, rather than based on web content from data packets.

Furthermore, load balancer 118 may employ any suitable routing policy. In one example, load balancer 118 employs a round robin distribution of requests, where requests are assigned without priority in a circular order. Additionally or alternatively, load balancer 118 can auto-scale load balancer 120 by determining how many load balancing units (e.g., servers) get instantiated within load balancer 120, such as based on a number of requests from clients to hosting infrastructure 112.

Load balancer 120 can be any suitable type of load balancer. In one example, load balancer 120 is a layer-7 load balancer, and operates at an application layer which operates on content of messages. Hence, load balancer 120 can read content of network traffic (e.g., a universal resource locator (URL) or cookies) and make a load-balancing decision based on the content to select an appropriate server from servers 122.

Servers 122 can include any number and type of servers for serving content (e.g., web content) and providing assets to computing device 102. Servers 122 can include Hypertext Transfer Protocol (HTTP) servers (e.g., servers that process requests in plain text or port 80 traffic), HTTP Secure (HTTPS) servers (e.g., servers that process secure requests, such as Transport Layer Security (TLS) requests, or port 443 traffic), and HTTP caching servers that store static assets, such as news feeds or weather, rather than accessing them from HTTP servers on every request. HTTP caching servers serve cached content over HTTP, and may process requests in plain text.

Servers 122 may include one or more servers or service providers that provide services and/or resources to computing device 102. The resources can include any suitable combination of services and content, such as made available over network 110 by one or more websites. Some examples of services include, but are not limited to, an on-line shopping service, a photo editing service, a web development and management service, a collaboration service, a social networking service, a messaging service, an advertisement service, a graphics design service, an image storage service (including storage of photos, documents, records, files, and the like), a graphics editing service, an asset distribution service, a recipe service, and so forth. Content may include various combinations of assets, including videos, ads, audio, multi-media streams, animations, images, web documents, web pages, applications, device applications, text documents, drawings, presentations, stock photographs, user profiles, user preferences, user data (e.g., images stored in an image gallery), maps, computer code, files, instructions, and the like. Assets may be made available to applications 104 and consumed (e.g., viewed or played) on computing device 102. In one example, hosting infrastructure 112 requires that computing device 102 authenticate itself to hosting infrastructure 112, such as by completing handshake 116, to access services, content, or services and content provided by servers 122.

Accordingly, hosting infrastructure 112 includes certificate management system 114 configurable to manage and serve certificates (e.g., SSL certificates) to negotiate a handshake for a handshake request from computing device 102. In one example, certificate management system 114 is implemented by load balancer 120 (e.g., a layer-7 load balancer) so that SSL certificate termination is done at layer 7.

Certificate management system 114 includes certificate management application 124 (discussed below in more detail). In one example, certificate management system 114 is implemented at least partially by storing instructions on storage 126 and executing the instructions on processors 128 included in certificate management system 114. For instance, processors 128 may execute portions of certificate management application 124.

Certificate management system 114 includes storage 126. Storage 126 can be any suitable type of storage accessible by or contained in certificate management system 114. Storage 126 stores data in memory, and provides access to and from memory included in storage 126 for any suitable type of data. For instance, storage 126 includes storage for handshake data (e.g., a handshake request, whether a handshake includes a hostname, an indication of whether a handshake supports SNI, data of a handshake message supplied by a client, copies of data sent to a client as part of a handshake, and the like), legacy data (e.g., a default certificate to send to a client when SNI is not supported, an indication of whether a client's web browser supports SNI, and the like), SNI data (e.g., a hostname, website, indication of whether a client's web browser supports SNI, and the like), certificate status data (e.g., status protocol data, such as OCSP stapling data, endpoint data for obtaining OCSP data, a list of revoked certificates, and the like), and content switching data (e.g., rules for content switching, such as switching based on protocol, hostname, request type, or request method, blacklisting rules, and the like).

Certificate management system 114 also includes cache memory 130. Cache memory 130 includes any suitable type of cache memory included in or accessible by certificate management system 114. In one example, cache memory 130 stores cached certificates (e.g., cached SSL certificates), cached status protocol data (e.g., cached OCSP stapling data), or combinations thereof, in accordance with the techniques and systems described herein. For instance, cache memory 130 stores certificates and status protocol data by lazy-loading the certificates and status protocol data when a hostname for the certificate is requested by a client, such as in a handshake request.

In one example, cache memory 130 includes a life control module (not shown in FIG. 1) that controls how long an object, such as an SSL certificate or OCSP data, remains in cache memory 130. For instance, objects in cache memory 130 are given a time-to-live managed by the life control module of cache memory 130. Upon expiration of an object's time-to-live, the respective object is removed from cache memory 130 by the life control module.

Additionally or alternatively, a life control module of cache memory 130 may implement an eviction algorithm In one example, cache memory 130 implements a least-recently-used eviction algorithm for certificates in cache memory 130, in which a certificate that has not been used (e.g., served) as recently as all other certificates is removed from cache memory 130 before the other certificates. For instance, least accessed certificates are evicted from cache memory 130 prior to other certificates. The eviction algorithm can be executed at any suitable time, such as periodically, when a new certificate is added to cache, when a time-to-live for a certificate expires, combinations thereof, and the like.

In one example, a life control module of cache memory 130 executes a first eviction algorithm on cached certificates, and a second eviction algorithm on cached status protocol data. Additionally or alternatively, a life control module of cache memory 130 executes one eviction algorithm over both cached certificates and cached status protocol data.

Furthermore, certificate management system 114 includes transceiver module 132. Transceiver module 132 is representative of functionality configured to transmit and receive data using any suitable type and number of communication protocols. For instance, data within certificate management system 114 may be transmitted to computing device 102 with transceiver module 132 over network 110. Furthermore, data can be received from computing device 102 with transceiver module 132. Transceiver module 132 can also transmit and receive data between components of hosting infrastructure 112, such as load balancer 118, load balancer 120, and servers 122, as well as obtain certificates from a common storage (discussed below in more detail).

Certificate management system 114 also includes certificate management application 124. Certificate management application 124 includes handshake receiving module 134, legacy support module 136, server name indication module 138, handshake sending module 140, certificate status module 142, and content switching module 144. These modules work in conjunction with each other to manage and negotiate certificates (e.g., SSL certificates) as part of a handshake between computing device 102 and hosting infrastructure 112 by lazy-loading certificates and status protocol data (e.g., OCSP data).

Furthermore, though the description of certificate management system 114 and certificate management application 124 describes managing and serving SSL certificates as example certificates, any suitable certificates can be managed and served. Moreover, though the description of certificate management system 114 and certificate management application 124 describes managing and serving OCSP data as example status protocol data, any suitable data associated with a certificate can be managed and served, such as metadata of a certificate, revision history of a certificate, time-to-live parameters of a certificate, and the like.

Handshake receiving module 134 is representative of functionality configured to receive a handshake request from a client, such as from computing device 102. Handshake receiving module 134 can receive any suitable data from computing device 102 to complete a handshake between computing device 102 and hosting infrastructure 112. A handshake request received by handshake receiving module 134 can be any suitable handshake request, such as a SSL handshake request. Accordingly, handshake receiving module 134 can receive a "hello" message from a client computing device. Handshake receiving module 134 determines if a handshake request received from a client includes a hostname, and generates a hostname indicator that indicates whether the handshake request includes a hostname. The hostname indicator can be any suitable indicator, and include a binary indicator (e.g., "1" indicates a hostname is present in the handshake request, and "0" indicates a hostname is absent in the handshake request). Additionally or alternatively, a hostname indicator can include a copy of a hostname included in a handshake request received by handshake receiving module 134. In one example, handshake receiving module 134 can determine if a handshake request received from a client includes a hostname by determining if a "hello" message from the client includes a hostname Furthermore, handshake receiving module 134 determines from a handshake request received from a client whether a web browser used to send the handshake request is compliant with a SNI protocol. In one example, when a handshake request received from a client includes a hostname, handshake receiving module 134 determines web browser used to send the handshake request is compliant with a SNI protocol. Otherwise, when a handshake request received from a client does not include a hostname, handshake receiving module 134 determines the web browser used to send the handshake request is not compliant with a SNI protocol. Accordingly, a hostname indicator generated by handshake receiving module 134 can indicate whether handshake receiving module 134 determines the web browser used to send the handshake request is compliant with a SNI protocol.

A handshake request received by handshake receiving module 134, along with any suitable information, such as a hostname indicator, metadata for the client device that sent the handshake request (e.g., an indication of whether the client's web browser supports SNI), and the like, used by or calculated by handshake receiving module 134 are stored in storage 126 and made available to modules of certificate management application 124. In one example, handshake receiving module 134 provides a hostname indicator to legacy support module 136 and server name indication module 138.

Legacy support module 136 is representative of functionality configured to provide backwards compatibility for web browsers that do not support SNI protocol. Accordingly, when the handshake request does not include a hostname, such as indicated by a hostname indicator provided by handshake receiving module 134, legacy support module 136 negotiates a handshake with the client by sending a default certificate to the client. Hence, the handshake is negotiated with a default certificate served by legacy support module 136 when SNI protocol is not supported by a client's web browser.

The default certificate served by legacy support module 136 can be any suitable default certificate. In one example, legacy support module 136 serves a default certificate including a Public Key Infrastructure (PKI) certificate.

Legacy support module 136 can obtain a default certificate in any suitable way. In one example, legacy support module 136 obtains default certificates from cache memory 130. Additionally or alternatively, legacy support module 136 can obtain a default certificate from storage 126. For instance, storage 126 may include a default certificate storage module (not shown) in which default certificates for websites are stored and managed. Default certificates can be assigned a time-to-live value that when expired, causes the respective default certificate to be removed from storage 126, cache memory 130, or both storage 126 and cache memory 130. Upon expiration of a time-to-live value for a default certificate, legacy support module 136 can obtain or generate a new default certificate to replace the expired default certificate.

A default certificate served by legacy support module 136, along with any suitable information, such as a time-to-live value of a default certificate, metadata of the default certificate, such as an indicator of the source of the default certificate (e.g., a certificate authority name or a component of hosting infrastructure 112), and the like, used by or calculated by legacy support module 136 are stored in storage 126 and made available to modules of certificate management application 124. In one example, legacy support module 136 provides an indication that a default certificate has been served to a client to certificate management system 114.

Server name indication module 138 is representative of functionality configured to negotiate a handshake with a client when a handshake request received by handshake receiving module 134 includes a hostname. For instance, the hostname can be for a website the client is attempting to access. Hence, server name indication module 138 negotiates a handshake with a client when the client's web browser supports a SNI protocol.

Server name indication module 138 determines a certificate for a hostname indicated in a handshake request by first determining if a cached certificate for the hostname is in cache memory 130. For instance, server name indication module 138 may search cache memory 130 using the hostname to determine if a cached certificate for the hostname is in cache memory 130. When a cached certificate for the hostname is in cache memory 130, server name indication module 138 determines the cached certificate as a certificate to send to the client, e.g., to negotiate the handshake by serving the cached certificate.

When a cached certificate for the hostname indicated in a handshake request is not in cache memory 130, however, server name indication module 138 obtains a certificate for the hostname from encrypted network storage 146 (describe below in more detail). For instance, hosting infrastructure 112, including load balancer 120, have access to encrypted network storage 146, and can provide data (e.g., a hostname) to encrypted network storage 146 to obtain a certificate for the hostname Server name indication module 138 adds the certificate obtained from encrypted network storage 146 to cache memory 130. In one example, the certificate is assigned a time-to-live value in cache memory 130 when it is added to cache memory 130. Server name indication module 138 determines the certificate obtained from encrypted network storage 146 and added to cache memory 130 as a certificate to send to the client, e.g., to negotiate the handshake by serving the certificate obtained from encrypted network storage 146.

A certificate to serve to a client determined by server name indication module 138, along with any suitable information, such as a time-to-live value for the certificate, an indicator of whether the certificate to serve was obtained from cache memory 130 or encrypted network storage 146, encryption and decryption data for the certificate, and the like, used by or calculated by server name indication module 138 are stored in storage 126 and made available to modules of certificate management application 124. In one example, server name indication module 138 provides a certificate to serve to a client computing device to handshake sending module 140, certificate status module 142, and content switching module 144.

Handshake sending module 140 is representative of functionality configured to send (e.g., serve) a certificate determined by server name indication module 138 to a client (e.g., to web browser 106). Hence, handshake sending module 140 serves a cached certificate from cache memory 130, or a certificate obtained from encrypted network storage 146, as determined by server name indication module 138.

Handshake sending module 140 can send any suitable data to computing device 102 to negotiate a handshake between computing device 102 and hosting infrastructure 112. In one example, a certificate obtained by server name indication module 138 (e.g., from encrypted network storage 146) is encrypted, and handshake sending module 140 decrypts the encrypted certificate to form a decrypted certificate that is sent to the client.

Furthermore, handshake sending module 140 receives status protocol data (e.g., OCSP stapling data) from certificate status module 142. The status protocol data can be any suitable data regarding a status of the certificate to serve to the client, such as a revocation status. In one example, handshake sending module 140 sends a certificate to a client including sending (e.g., serving) status protocol data to the client, such as by sending the certificate and the status protocol together as part of negotiating a handshake between computing device 102 and hosting infrastructure 112.

A certificate and status protocol data served to a client by handshake sending module 140, along with any suitable information, such as an indication of whether the handshake is complete, whether a reply is needed from computing device 102, and the like, used by or calculated by server name indication module 138 are stored in storage 126 and made available to modules of certificate management application 124. In one example, handshake sending module 140 indicates to handshake receiving module 134 that a certificate, status protocol data, or a certificate and status protocol data has been sent to a client device.

Certificate status module 142 is representative of functionality configured to determine status protocol data to send to a client as part of negotiating a handshake, such as between computing device 102 and hosting infrastructure 112. In one example, certificate status module 142 determines OCSP stapling data as status protocol data to send to a client.

Status protocol data determined by certificate status module 142 can indicate any suitable status of a certificate. In one example, status protocol data indicates a revocation status of a certificate. For instance, a certificate may be revoked by a certificate authority who issued the certificate, a business owner of a website using the certificate, or by hosting infrastructure 112 for any suitable reason, such as a certificate being compromised (e.g., obtained by unauthorized parties), a website using the certificate being under construction or inaccessible, a business owning a website that uses the certificate going out of business, and the like. Additionally or alternatively, status protocol data determined by certificate status module 142 can indicate a time-to-live value of a certificate, such as a first time-to-live value for a certificate in cache memory 130, a second time-to-live value for a certificate in encrypted network storage 146, or combinations thereof.

Certificate status module 142 determines status protocol data to serve to a client by first determining if cached status protocol data for a certificate to send to a client is in cache memory 130. When cached status protocol data for the certificate to send to the client is in cache memory 130, certificate status module 142 determines the cached status protocol data as status protocol data to send to the client.

However, when cached status protocol data for the certificate to send to the client is not in cache memory 130, certificate status module 142 obtains an endpoint indicated by the certificate. An endpoint can be any suitable endpoint, such as a certificate authority who issued the certificate. Certificate status module 142 requests status protocol data from the endpoint, such as by transmitting a request to a certificate authority using transceiver module 132. Certificate status module 142 then receives from the endpoint, responsive to the request, status protocol data for the certificate to send to the client. Certificate status module 142 adds the status protocol data obtained from the endpoint to cache memory 130, and determines the status protocol data obtained from the endpoint and added to cache memory 130 as status protocol data to send to the client (e.g., to serve to computing device 102 to negotiate a handshake between computing device 102 and hosting infrastructure 112).

By serving status protocol data together with certificates (e.g., OCSP data and SSL certificates sent together to a client as part of a SSL handshake), the client is not required to request the status protocol data directly from a certificate authority. Thus, by acting as a proxy for the certificate authority, hosting infrastructure 112 provides the status protocol data to the client with less delay to the client, and without exposing the client's web browser data to the certificate authority.

Status protocol data to serve to a client determined by certificate status module 142, along with any suitable information, such as a time-to-live value for the certificate, a reason why a certificate has been revoked, and the like, used by or calculated by certificate status module 142 are stored in storage 126 and made available to modules of certificate management application 124. In one example, certificate status module 142 provides status protocol data to serve to a client computing device to handshake sending module 140.

Content switching module 144 is representative of functionality configured to determine one or more servers to serve content requested by computing device 102 based on the content. Content switching module 144 receives a certificate to serve to a client from server name indication module 138 and decrypts encrypted content (e.g., web traffic) based on the certificate to form decrypted content. For instance, content switching module 144 may decrypt encrypted content using a private key associated with the certificate.

Content switching module 144 analyzes the decrypted content to form analyzed content. Content switching module 144 can analyze the decrypted content in any suitable way, such as by determining a type of content (e.g., video, images, text, etc.), parsing the decrypted content, determining objects included in images of the content, applying language classifiers to the content, determining a source of the content, and the like. Based on the analyzed content, such as based on a type of the content or a creator of the content, content switching module 144 determines one or more servers of servers 122 to serve the encrypted content to the client.

Content switching module 144 can implement any suitable content switching policy to determine servers of servers 122 to serve the encrypted content to the client based on the analyzed content. Examples of content switching policies implementable by Content switching module 144 are listed in Table 1 below.

TABLE 1

Example Content Switching Policies

| Switching Policy | Description |
| --- | --- |
| Protocol Based | Route HTTP requests to a first set of servers, and route HTTPS requests to a second set of servers |
| Hostname Based | Single tenant: have a dedicated server pool for a single hostname<br>Multi-tenant: serve multiple websites from a shared server pool |
| Request Type Based | Route requests for static assets to a first set of servers, and route requests for dynamic content to a second set of servers |

TABLE 1-continued

Example Content Switching Policies

| Switching Policy | Description |
| --- | --- |
| Request Method Based | Route GET requests to a first set of servers, and other request methods to a second set of servers |
| Blacklisting | Do not serve requests based on IP, country code, or other content |

Indications of servers determined by content switching module 144, along with any suitable information, such as a switching policy used to select servers, a private key used to decrypt encrypted content, decrypted content, and the like, used by or calculated by content switching module 144 are stored in storage 126 and made available to modules of certificate management application 124.

Environment 100 also includes encrypted network storage 146 that is coupled to network 110. Encrypted network storage 146 is a common storage (e.g., shared storage) that stores certificates (e.g., SSL certificates) for websites hosted by hosting infrastructure 112. In one example, encrypted network storage 146 stores encrypted certificates. Encrypted network storage 146 is accessible to hosting infrastructure 112 and components of hosting infrastructure 112, such as load balancer 118, load balancer 120, and servers 122. Hosting infrastructure 112 can access encrypted network storage 146 in any suitable way. In one example, hosting infrastructure 112 accesses encrypted network storage 146 via network 110.

An owner of a website hosted by hosting infrastructure 112 can request that a certificate be generated by a certificate authority and stored on encrypted network storage 146. Certificates stored on encrypted network storage 146 can be assigned a time-to-live when they are generated and stored, such as three months. Upon expiration of the time-to-live, a certificate may be revoked. For instance, a certificate authority who issued the certificate may indicate via OCSP stapling data for the certificate that the certificate is revoked. Details of data flow to and from encrypted network storage 146 are discussed in more detail below with regards to FIG. 2.

Having considered an example digital medium environment, consider now a discussion of an example data flow diagram for the example digital medium environment in accordance with one or more aspects of the disclosure.

FIG. 2 illustrates an example data flow diagram 200 for the environment 100 in FIG. 1 in accordance with one or more aspects of the disclosure. Diagram 200 includes business owner 202, web application 204, certificate authority 206, and web page 208. Diagram 200 also includes encrypted network storage 146, hosting infrastructure 112, and computing device 102 (e.g., a client computing device) as described previously with respect to FIG. 1.

In the example in FIG. 2, business owner 202 (e.g., a chef as illustrated in FIG. 2) owns a website hosted by hosting infrastructure 112. Web page 208 displayed on computing device 102 is a representation of a website owned by business owner 202 and hosted by hosting infrastructure 112. Business owner 202 provides user input to web application 204 to indicate that business owner 202 desires that a new certificate (e.g., SSL certificate) be generated for the website owned by business owner 202 and hosted by hosting infrastructure 112.

Web application 204 can be any suitable web application on any suitable computing device accessible to business owner 202, such as a smart phone, tablet, personal computer, laptop, and the like. Web application 204 receives user input from business owner 202, and sends a request for a certificate to certificate authority 206.

Certificate authority 206 receives the request from web application 204, and in response, generates a new certificate (e.g., a SSL certificate) for the website owned by business owner 202. Certificate authority 206 can be any suitable certificate authority that can generate and sign certificates for use on websites, such as a public certificate authority, private certificate authority, enterprise certificate authority, government-operated certificate authority, and the like. Hence, certificate authority 206 is a third party relative to computing device 102, business owner 202, and hosting infrastructure 112 (e.g., certificate authority 206 is a different entity than computing device 102, business owner 202, and hosting infrastructure 112). Certificate authority 206 generates a certificate (e.g., a new certificate) and provides the certificate to web application 204.

Web application 204 provides the certificate received from certificate authority 206 to encrypted network storage 146. Encrypted network storage 146 stores encrypted certificates (e.g., the certificates received by web application 204 from certificate authority 206 are encrypted and stored on encrypted network storage 146). In one example, web application 204 encrypts certificates received from certificate authority 206 and provides encrypted certificates to encrypted network storage 146. Additionally or alternatively, encrypted network storage 146 encrypts certificates received from web application 204 and stores encrypted certificates.

Once a certificate is received by and stored at encrypted network storage 146, it is immediately available to hosting infrastructure 112, such as to be lazy-loaded as described above. For instance, server name indication module 138 of hosting infrastructure 112 may obtain a certificate stored on encrypted network storage 146, add the certificate to cache memory 130, and serve the certificate to computing device 102 as part of a handshake between hosting infrastructure 112 and computing device 102.

As illustrated in FIG. 2, computing device 102 requests a website owned by business owner 202 and hosted by hosting infrastructure 112. Hosting infrastructure 112 obtains a certificate for the requested web site, such as from encrypted network storage 146, decrypts the certificate, and serves the decrypted certificate to computing device 102 so that computing device 102 can compete the handshake with hosting infrastructure 112 and authenticate itself Once computing device 102 is authenticated (e.g., a handshake between computing device 102 and hosting infrastructure 112 is negotiated), web page 208 representing a website owned by business owner 202 is displayed on computing device 102. In the example in FIG. 2, business owner 202 is a chef, and web page 208 displays recipes and pictures of food made from the recipes (e.g., Chef Luigi's spaghetti with meatballs). The recipes may be offered for sale, such as on a subscription basis, requiring that computing device 102 be authenticated to access web page 208.

Having considered an example digital medium environment and example data flow diagram for the digital medium environment, consider now a discussion of an example system usable to manage and negotiate certificates in accordance with one or more aspects of the disclosure.

Example Certificate Management System

Figure 3:
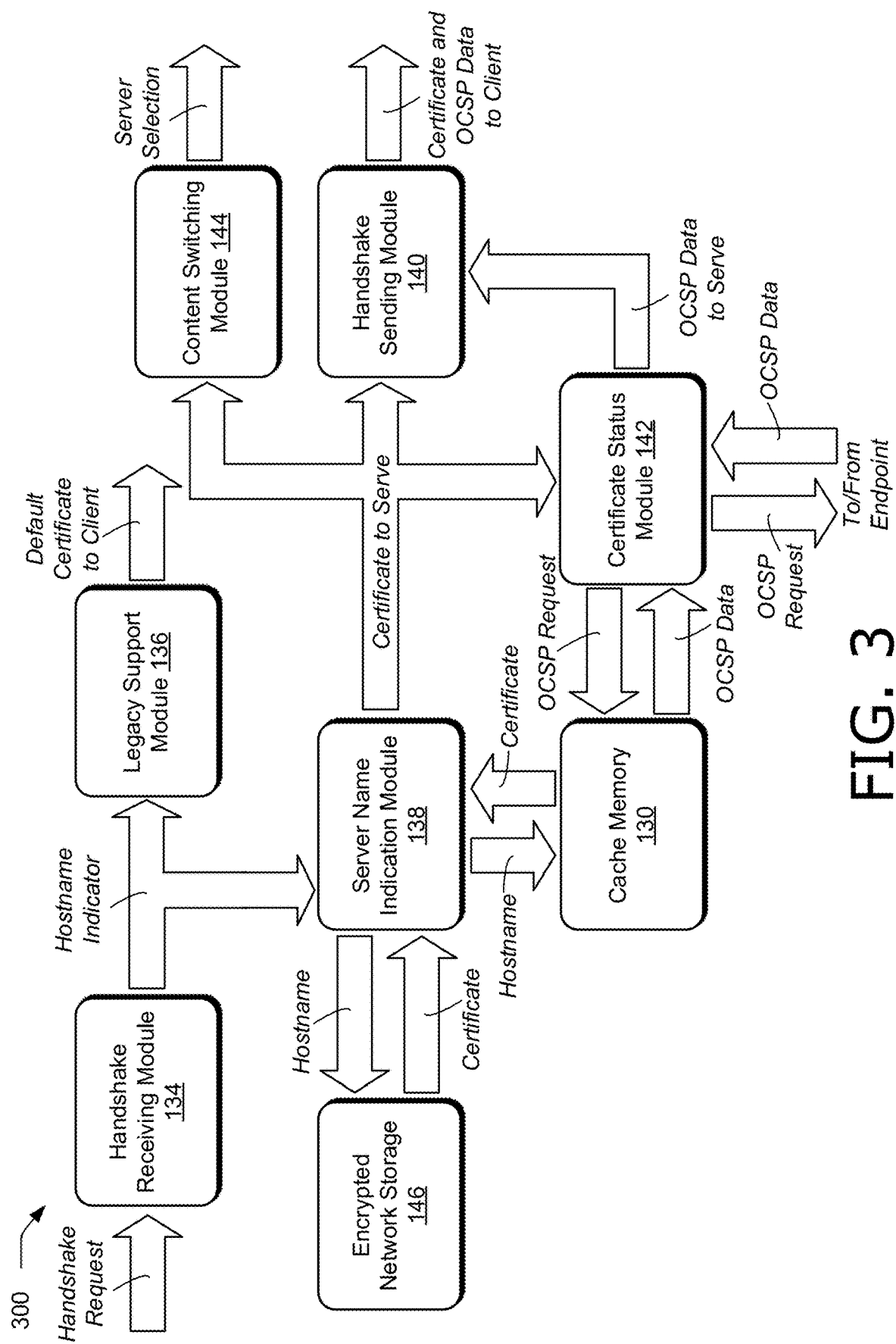
FIG. 3 illustrates an example system usable to manage and negotiate certificates in accordance with one or more aspects of the disclosure.

FIG. 3 illustrates an example system 300 usable to manage and negotiate certificates, such as SSL certificates, in accordance with one or more aspects of the disclosure. In this implementation, system 300 includes the modules of certificate management application 124 as described in FIG. 1, e.g., handshake receiving module 134, legacy support module 136, server name indication module 138, handshake sending module 140, certificate status module 142, and content switching module 144, along with cache memory 130 and encrypted network storage 146. System 300 is one example of certificate management system 114 that can be constructed using the modules of certificate management application 124. For instance, signals can be redefined, and modules can be modified, combined, divided, added, or removed to form a modified system, without altering the functionality of system 300. Accordingly, such modified systems are considered to be within the scope of the disclosure.

Furthermore, for simplicity system 300 is limited to the modules of certificate management application 124 together with cache memory 130 and encrypted network storage 146, and a description of some of their interconnects. System 300 can, however, include any suitable signals and communications between modules omitted for simplicity. Such signals may include system clocks, counters, data flags, sequence indicators, reset signals, and the like. In one example, system 300 can operate in real time (e.g., with no perceptible delay to a client). Accordingly, signals can be calculated by the modules of system 300 and communicated between the modules of system 300 without significant delay, so that a certificate and status protocol data can be served, and handshake negotiated, without perceptible delay to a client.

Moreover, system 300 can be implemented on any suitable device or devices. In one example, system 300 is implemented by a load balancer, such as load balancer 120 in FIG. 1. Additionally or alternatively, system 300 can be implemented on more than one computing device, server, or load balancer. For instance, parts of system 300 can be implemented by a first computing device, such as one load balancer of load balancer 120 in FIG. 1, and other parts of system 300 can be implemented by an additional computing device or devices, such as an additional load balancer of load balancer 120. In one example, a server implements parts of system 300, such as one or more of servers 122 in FIG. 1.

Handshake receiving module 134 receives a handshake request. The handshake request may be a SSL handshake request according to a SSL protocol from a client device attempting to access a website hosted by a hosting infrastructure that includes system 300. Handshake receiving module 134 determines whether the received handshake request includes a hostname, such as a hostname for the website the client device is attempting to access. Handshake receiving module 134 can determine whether the received handshake request includes a hostname in any suitable way, such as by parsing a "hello" message of the handshake request. Based on determining whether the received handshake request includes a hostname, handshake receiving module 134 generates a hostname indicator that indicates whether or not the received handshake request includes a hostname. In one example, a hostname indicator includes a copy of a hostname or an indicator of the hostname (e.g., a hostname number in a list of hostnames) when a received handshake request includes the hostname Handshake receiving module 134 provides a hostname indicator to legacy support module 136 and server name indication module 138.

Legacy support module 136 receives a hostname indicator from handshake receiving module 134. When a hostname indicator received from handshake receiving module 134 indicates that a hostname is not included in a handshake request, or SNI is not supported by a client's web browser, legacy support module 136 obtains a default certificate and sends the default certificate to the client. Hence, when SNI is not supported and a hostname for a website is not included in a handshake request received by handshake receiving module 134, legacy support module 136 negotiates a handshake with a client by serving a default certificate, such as a default SSL certificate.

Server name indication module 138 also receives a hostname indicator from handshake receiving module 134. Hence, when the hostname indicator indicates that a hostname is included in a handshake request received by handshake receiving module 134, server name indication module 138 determines a certificate to serve to the client, instead of legacy support module 136 serving a default certificate.

Server name indication module 138 receives a hostname indicator from handshake receiving module 134 and determines the hostname, such as by extracting the hostname from the hostname indicator. Server name indication module 138 provides the hostname to cache memory 130 to determine if a certificate for the website served by the hostname is in cache memory 130. When a certificate corresponding to the hostname is in cache memory 130, server name indication module 138 determines the cached certificate as a certificate to send to a client (e.g., to serve and negotiate a handshake with the client).

However, when a certificate corresponding to the hostname is not in cache memory 130, server name indication module 138 obtains a certificate from encrypted network storage 146 and determines the certificate obtained from encrypted network storage 146 as a certificate to send to a client (e.g., to serve and negotiate a handshake with the client). Furthermore, server name indication module 138 adds a certificate obtained from encrypted network storage 146 to cache memory 130.

In one example, server name indication module 138 decrypts an encrypted certificate, e.g., a cached certificate obtained from cache memory, or a certificate obtained from encrypted network storage 146, and determines the decrypted certificate as a certificate to send to a client (e.g., to serve and negotiate a handshake with the client).

Server name indication module 138 provides a certificate to serve to a client to handshake sending module 140, certificate status module 142, and content switching module 144.

Certificate status module 142 receives a certificate (e.g., a certificate to serve to a client) and determines status protocol data, such as OCSP stapling data, for the certificate. Status protocol data for a certificate can indicate any suitable status of a certificate, such as a revocation status. Certificate status module 142 requests status protocol data from cache memory 130. When cached status protocol data for the certificate to send to the client is in cache memory 130, certificate status module 142 determines the cached status protocol data as status protocol data to send to the client.

However, when status protocol data for the certificate to send to the client is not in cache memory 130, certificate status module 142 obtains additional status protocol data for the certificate to send to the client. For instance, certificate status module 142 can determine an endpoint indicated by the certificate to send to the client, such as a certificate authority, and send a request for additional status protocol data for the certificate to the endpoint. Certificate status module 142 can then receive the additional status protocol data for the certificate from the endpoint, and determine the additional status protocol data received from the endpoint as status protocol data to send to the client. Moreover, certificate status module 142 adds the additional status protocol data received from the endpoint to cache memory 130, for future access (e.g., to negotiate future handshakes). Certificate status module 142 provides status protocol data to send to a client (e.g., obtained from cache memory 130 or an endpoint) to handshake sending module 140.

Handshake sending module 140 receives a certificate to serve from server name indication module 138 and status protocol data to send to the client from certificate status module 142. Handshake sending module 140 negotiates a handshake between a client and system 300 by sending to the client a certificate to serve from server name indication module 138, status protocol data for the certificate from certificate status module 142, or a certificate to serve from server name indication module 138 and status protocol data for the certificate from certificate status module 142. Hence, system 300 enables a client to authenticate itself to system 300.

Content switching module 144 receives a certificate to serve from server name indication module 138 and determines one or more servers of a plurality of servers to serve the content to the client based on the content. For instance, content switching module 144 may employ one or more of content switching policies described above in Table 1.

In one example, content switching module 144 decrypts encrypted content based on a certificate sent to the client by handshake sending module 140. For instance, a private key associated with the certificate may be used by content switching module 144 to decrypt encrypted content and form decrypted content. Content switching module 144 analyzes decrypted content to form analyzed content (e.g., by determining a type of the content, such as text, images, or video, a creator of the content, keywords included in the content, objects included in images of the content, digital-rights-management of the content, such as based on whether the content can be copied, and the like) and determines one or more servers of a plurality of servers to serve the encrypted content to the client based on the analyzed content.

System 300 constitutes an improvement over systems that implement a respective virtual host for each hostname, or require reconfiguration of a hosting platform to accommodate a new hostname or newly-generated certificate. By lazy-loading the certificates into memory, system 300 accommodates a new hostname on-the-fly, without requiring the reconfiguring of load balancers or a hosting platform. Furthermore, a newly-generated certificate stored on an encrypted network storage device is accessible to system 300 immediately upon being deployed. For instance, when a client requests a website hosted by a hosting infrastructure employing system 300, a certificate for the hostname is lazy-loaded by obtaining the certificate from cache memory if the certificate is available in the cache memory. Otherwise, if a certificate for the hostname is not available in cache memory, the certificate is obtained from the encrypted network storage device and placed into cache memory for future requests. Hence, a latest version of the certificate is efficiently provided to the client.

Furthermore, status protocol data (e.g., OCSP stapling data) that indicates a revocation status of a certificate is also lazy-loaded and served together with a certificate to the client, without requiring the client to request the status protocol data directly from a certificate authority. Thus, by acting as a proxy for the certificate authority, system 300 provides the status protocol data to the client with less delay to the client, and without exposing client browser data to the certificate authority.

Moreover, by implementing system 300 at load balancers of the hosting infrastructure (e.g., layer-7 load balancers), termination of SSL certificates is managed at the load balancers, rather than by servers coupled to the load balancers. Consequently, the load balancers not only serve an appropriate certificate based on the lazy-loading, but also can decrypt content using the certificate and make content switching decisions based on the content. Thus, content switching tasks can be relieved from servers coupled to the load balancers, and instead implemented by the load balancers. Accordingly, auto-scaling of servers is efficient, as the servers are viewed as disposable resources.

Having considered an example system 300, consider now a discussion of example procedures for managing and negotiating certificates in accordance with one or more aspects of the disclosure.

Example Procedures

Figure 4:
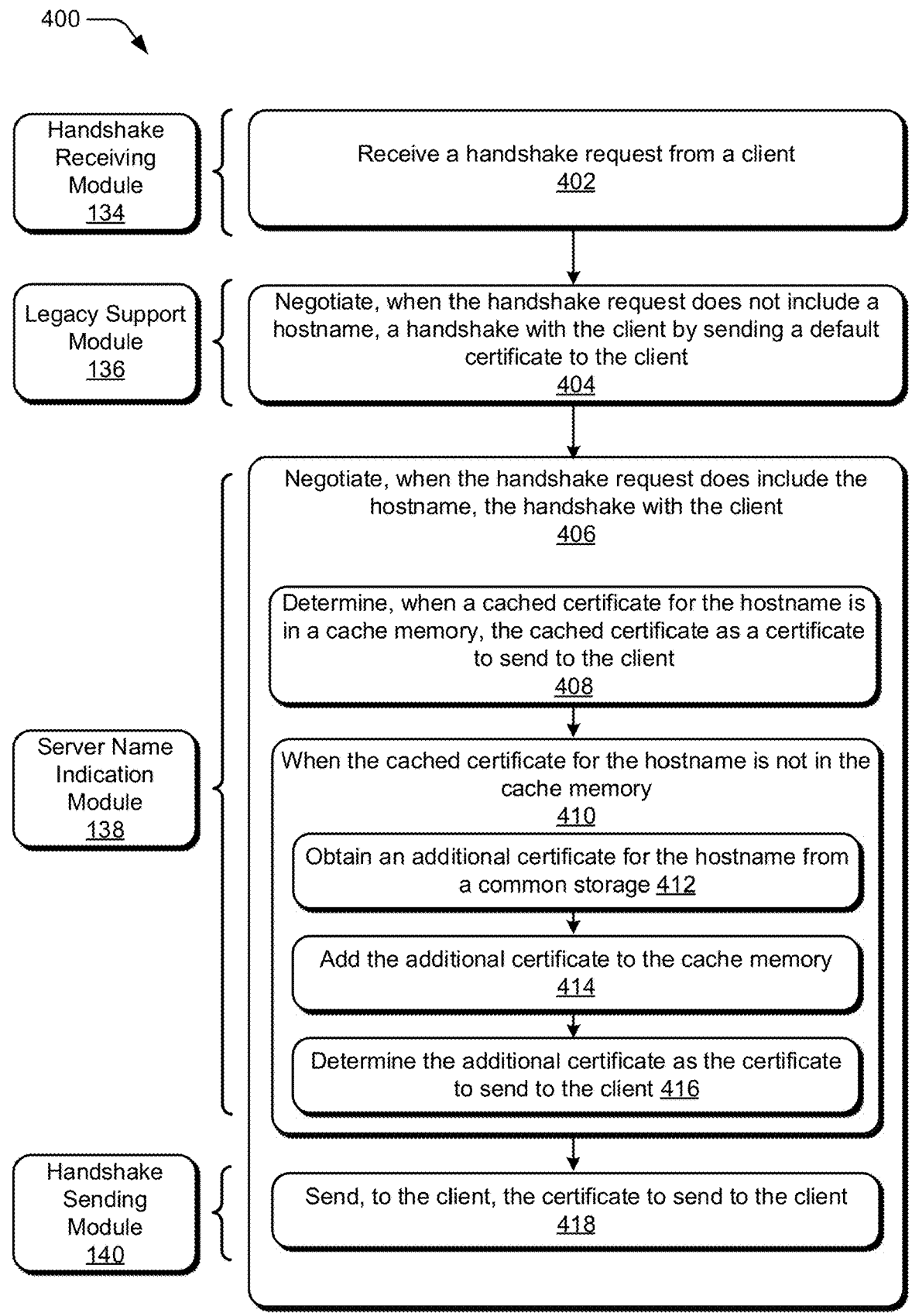
FIG. 4 illustrates a flow diagram depicting an example procedure in accordance with one or more aspects of the disclosure.

FIG. 4 illustrates an example procedure 400 for managing and negotiating certificates in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more components of hosting infrastructure 112 of FIG. 1 (e.g., load balancer 120) that makes use of a certificate management system, such as system 300 or certificate management system 114. A certificate management system implementing procedure 400 may be an independent application that has been installed on the computing device, a service hosted by a service provider that is accessible by the computing device, a plug-in module to the computing device, or combinations thereof.

A handshake request is received from a client (block 402). In one example, handshake receiving module 134 receives a handshake request from a client. The handshake request can be an SSL handshake request according to a SSL protocol.

When the handshake request does not include a hostname, a handshake with the client is negotiated by sending a default certificate to the client (block 404). In one example, legacy support module 136 negotiates a handshake with the client by sending a default certificate to the client. Additionally or alternatively, legacy support module 136 negotiates a handshake with the client by sending a default certificate to the client when the client's web browser does not support a SNI protocol.

When the handshake request does include the hostname, the handshake with the client is negotiated by entering block 406. Block 406 includes block 408, block 410, block 412, block 414, block 416, and block 418. Additionally or alternatively, the handshake with the client is negotiated by entering block 406 when the client's web browser does not support a SNI protocol.

When a cached certificate for the hostname is in a cache memory, the cached certificate is determined as a certificate to send to the client (block 408). In one example, server name indication module 138 determines a cached certificate as a certificate to send to the client.

When the cached certificate for the hostname is not in the cache memory, block 410 is entered. Block 410 includes block 412, block 414, and block 416.

An additional certificate for the hostname is obtained from a common storage (block 412). In one example, server name indication module 138 obtains an additional certificate for the hostname from a common storage. Common storage can include encrypted network storage, such as encrypted network storage 146 in FIG. 1 and FIG. 2. Common storage can store encrypted certificates and a respective time-to-live value for each of the encrypted certificates. A respective encrypted certificate can be removed from the common storage upon expiration of the respective time-to-live value for the respective encrypted certificate.

Moreover, a load balancer and the multiple servers can access the common storage. In one example, the additional certificate is provided to the common storage responsive to a request by an owner of a website served by the hostname. The load balancer may not be informed when the additional certificate is provided to the common storage.

In one example, the common storage stores certificates and a respective time-to-live value for each of the certificates, and a respective certificate is removed from the common storage upon expiration of the respective time-to-live value for the respective certificate.

The additional certificate is added to the cache memory (block 414). In one example, server name indication module 138 adds the additional certificate to the cache memory. Additionally or alternatively, the cache memory evicts certificates from the cache memory according to a least recently used algorithm in which least accessed certificates are evicted from the cache memory prior to other certificates.

The additional certificate is determined as the certificate to send to the client (block 416). In one example, server name indication module 138 determines the additional certificate as the certificate to send to the client.

The certificate to send to the client is sent to the client (block 418). In one example, handshake sending module 140 sends to the client the certificate to send to the client. Furthermore, handshake sending module 140 can decrypt the certificate to send to the client prior to sending the certificate. The certificate to send to the client can be issued by a certificate authority other than a load balancer, the client, and an owner of a website served by the hostname. Additionally or alternatively, the additional certificate is encrypted, and the sending, to the client, the certificate to send to the client includes decrypting the additional certificate to form a decrypted certificate and sending the decrypted certificate to the client.

In one example, when the common storage and the cache memory do not include a certificate for the hostname, the sending, to the client, the certificate to send to the client includes sending a default certificate.

Additionally or alternatively, when the handshake request does include the hostname, cached status protocol data (e.g., OCSP stapling data) is determined as status protocol data to send to the client when the cached status protocol data for the certificate to send to the client is in the cache memory. Otherwise, when the cached status protocol data for the certificate to send to the client is not in the cache memory, additional status protocol data for the certificate to send to the client is obtained from an endpoint indicated by the certificate to send to the client. The additional status protocol data is added to the cache memory, and the additional status protocol data is determined as the status protocol data to send to the client. Sending, to the client, the certificate to send to the client includes sending the status protocol data to send to the client. The status protocol data to send to the client can comprise a revocation status of the certificate to send to the client, including a time-to-live value, an expiration date, and the like.

In one example, based on the certificate sent to the client, encrypted content can be decrypted to form decrypted content. The decrypted content can be analyzed to form analyzed content, and one or more servers from among multiple servers can be determined to serve the encrypted content to the client based on the analyzed content. For instance, Table 1 discussed above describes content switching policies for selecting servers based on the analyzed content.

Figure 5:
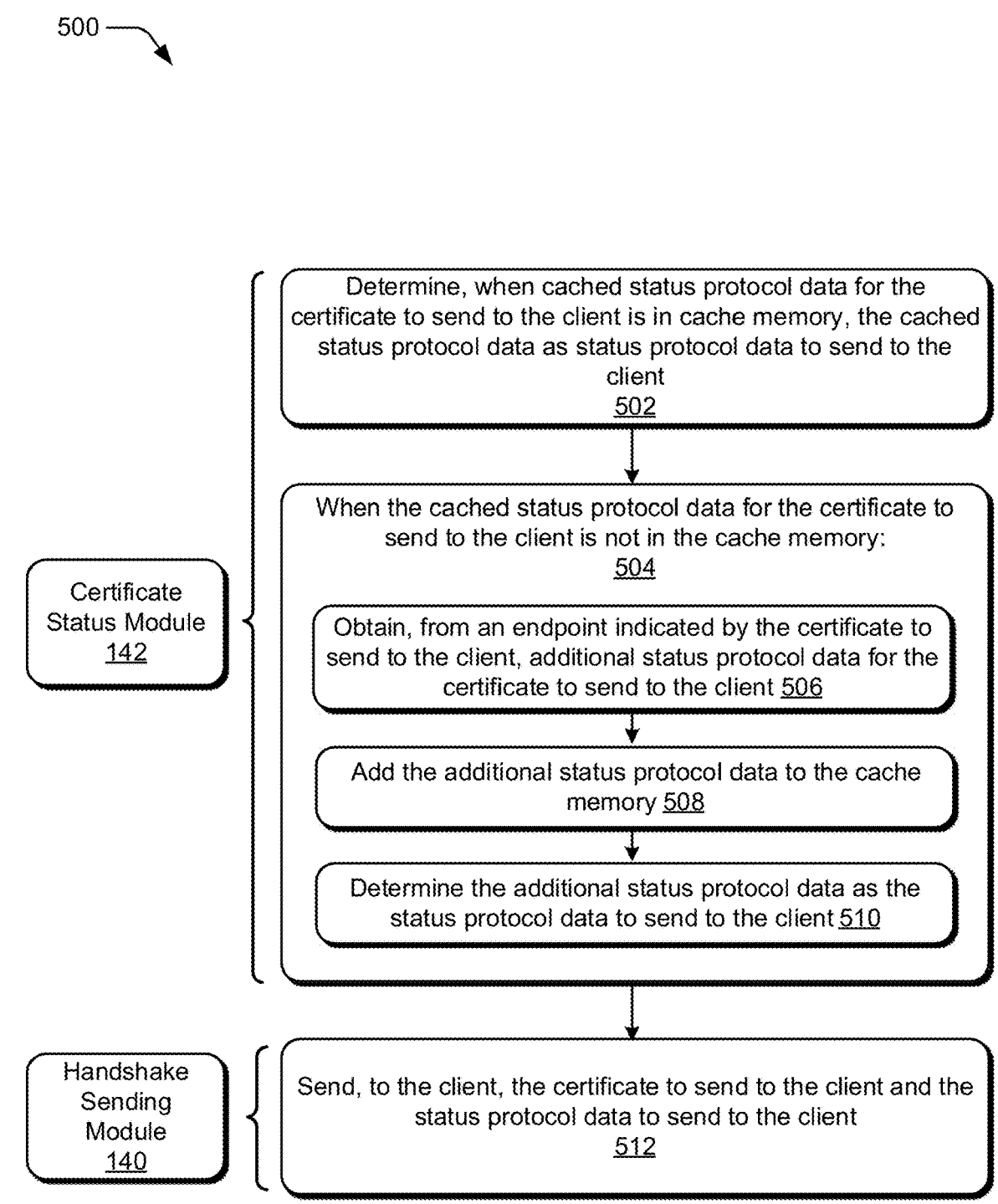
FIG. 5 illustrates a flow diagram depicting an example procedure in accordance with one or more aspects of the disclosure.

FIG. 5 illustrates an example procedure 500 for managing and negotiating certificates and status protocol data in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more components of hosting infrastructure 112 of FIG. 1 (e.g., load balancer 120) that makes use of a certificate management system, such as system 300 or certificate management system 114. A certificate management system implementing procedure 500 may be an independent application that has been installed on the computing device, a service hosted by a service provider that is accessible by the computing device, a plug-in module to the computing device, or combinations thereof.

In one example, procedure 500 is performed in conjunction with procedure 400 described in FIG. 4. For instance, upon completion of part or all of procedure 400 in FIG. 4, procedure 500 in FIG. 5 is entered, so that parts of procedure 400 and procedure 500 form a single procedure. In one example, procedure 500 is entered from block 416 of procedure 400, so that block 418 in procedure 400 is skipped, and instead the certificate to send to the client is sent to the client as part of procedure 500 rather than as part of procedure 400.

When cached status protocol data for the certificate to send to the client is in the cache memory, the cached status protocol data is determined as status protocol data to send to the client (block 502). In one example, certificate status module 142 determines the cached status protocol data as status protocol data to send to the client when cached status protocol data for the certificate to send to the client is in the cache memory.

When the cached status protocol data for the certificate to send to the client is not in the cache memory, block 504 is entered. Block 504 includes block 506, block 508, and block 510.

Additional status protocol data for the certificate to send to the client is obtained from an endpoint indicated by the certificate to send to the client (block 506). In one example, certificate status module 142 obtains additional status protocol data for the certificate to send to the client from an endpoint indicated by the certificate to send to the client.

The additional status protocol data is added to the cache memory (block 508). In one example, certificate status module 142 adds the additional status protocol data to the cache memory.

The additional status protocol data is determined as the status protocol data to send to the client (block 510). In one example, certificate status module 142 determines the status protocol data to send to the client.

The certificate to send to the client and the status protocol data to send to the client is sent to the client (block 512). In one example, handshake sending module 140 sends to the client the certificate to send to the client and the status protocol data to send to the client. The certificate to send to the client can include a SSL certificate, and the status protocol data to send to the client can include OCSP stapling data.

In one example, encrypted content is decrypted based on the certificate sent to the client to form decrypted content. The decrypted content is analyzed to form analyzed content, and one or more servers of a plurality of servers are selected to serve the encrypted content to the client based on the analyzed content. Table 1 discussed above describes content switching policies for selecting servers based on the analyzed content.

The procedures described herein constitute an improvement over procedures that implement a respective virtual host for each hostname, or require reconfiguration of a hosting platform to accommodate a new hostname or newly-generated certificate. By lazy-loading the certificates into memory, a new hostname can be accommodated on-the-fly, without reconfiguring load balancers or a hosting platform. Furthermore, a newly-generated certificate stored on an encrypted network storage device is accessible the hosting infrastructure immediately upon being deployed. For instance, when a client requests a website hosted by a hosting infrastructure employing the procedures described herein, a certificate for the hostname is lazy-loaded by obtaining the certificate from cache memory if the certificate is available in the cache memory. Otherwise, if a certificate for the hostname is not available in cache memory, the certificate is obtained from the encrypted network storage device and placed into cache memory for future requests. Hence, a latest version of the certificate is efficiently provided to the client.

Furthermore, status protocol data (e.g., OCSP stapling data) that indicates a revocation status of a certificate is also lazy-loaded and served together with a certificate to the client, without requiring the client to request the status protocol data directly from a certificate authority. Thus, by acting as a proxy for the certificate authority, the hosting infrastructure that employs the procedures described herein provides the status protocol data to the client with less delay to the client than other procedures, and without exposing client browser data to the certificate authority.

Moreover, by implementing the procedures described herein at load balancers of the hosting infrastructure (e.g., layer-7 load balancers), termination of SSL certificates is managed at the load balancers, rather than by servers coupled to the load balancers. Consequently, the load balancers can not only serve an appropriate certificate based on the lazy-loading, but also decrypt content using the certificate and make content switching decisions based on the content. Thus, content switching tasks can be relieved from servers coupled to the load balancers, and instead implemented by the load balancers. Accordingly, auto-scaling of servers is efficient, as the servers are viewed as disposable resources.

Having considered example procedures in accordance with one or more implementations, consider now example systems and devices that can be utilized to practice the inventive principles described herein.

Example Systems and Devices

FIG. 6 illustrates an example system generally at 600 that includes example client computing devices 602-1, 602-2, 602-3, 602-4, and 602-5 (collectively 602). Client computing devices 602 can be any suitable client computing device. Computing device 102 in FIG. 1 and FIG. 2 is an example of client computing devices 602. Client computing devices 602 may include an on-chip system, multiple computing devices, combinations thereof, or any other suitable computing device or computing system. Accordingly, FIG. 6 illustrates client computing devices 602 as one or more of a tablet, a laptop computer, a smart phone, smart eye glasses, and a camera, though these examples are illustrative and in no way are meant to limit the type or number of devices included in client computing devices 602.

Furthermore, client computing devices 602 are coupled to "cloud" 604 including platform 606 that is representative of one or more computing systems and devices that may implement the various techniques described herein. This is illustrated through inclusion of certificate management system 114, system 300, certificate management application 124, and SNI support module 108 in platform 606, which operate as described above.

Functionality of client computing devices 602 may be implemented all or in part through use of a distributed system, such as over a "cloud" 604 via a platform 606. Furthermore, platform 606 may host data accessible by client computing devices 602, and therefore client computing devices 602 may be required to be authenticated to platform 606 by negotiating a handshake (e.g., a SSL handshake) with platform 606. Hence, platform 606 serves certificates (e.g., SSL certificates) to client computing devices 602.

Cloud 604 includes and is representative of a platform 606. Platform 606 abstracts underlying functionality of hardware (e.g., servers) and software resources of cloud 604, and includes resources 620. Resources 620 may include applications, data, services, and content that can be utilized while computer processing is executed on servers that are remote from client computing devices 602. Resources 620 can also include services provided over the Internet, through a subscriber network, such as a cellular or Wi-Fi network, or combinations thereof. Resources 620 include hosting infrastructure 112 and encrypted network storage 146, which operate as previously described to manage and serve SSL certificates to client computing devices 602 so that client computing devices 602 can access services and content hosted by platform 606.

Platform 606 includes a processing system 608, one or more computer-readable media 610, and one or more I/O interfaces 612 that are communicatively coupled to each other. Although not shown, platform 606 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 608 is representative of functionality to perform one or more operations using hardware. Accordingly, processing system 608 is illustrated as including hardware elements 614 that may be configured as processors, functional blocks, and so forth. This may include implementation in hardware as an application specific integrated circuit or other logic device formed using one or more semiconductors. Hardware elements 614 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 128 in FIG. 1 are an example of processing system 608.

Computer-readable media 610 (e.g., computer-readable storage media) is illustrated as including memory/storage 616. Storage 126 in FIG. 1 is an example of memory/storage included in memory/storage 616. Memory/storage component 616 may include volatile media (such as random access memory (RAM)), nonvolatile media (such as read only memory (ROM), Flash memory, optical disks, magnetic disks, and so forth), or combinations thereof. Memory/storage component 616 may include fixed media (e.g., RAM, ROM, a fixed hard drive, and so on) as well as removable media (e.g., Flash memory, a removable hard drive, an optical disc, and so forth). Computer-readable media 610 may be configured in a variety of other ways as further described below.

Input/output interface(s) 612 are representative of functionality to allow a user (e.g., a system administrator of platform 606) to enter commands and information to platform 606, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, platform 606 may be configured in a variety of ways as further described below to support user interaction.

Platform 606 also includes applications 618. Applications 618 are representative of any suitable applications capable of running on platform 606, and may include a web browser which is operable to access various kinds of web-based resources (e.g., assets, media clips, images, content, configuration files, services, user profiles, and the like), and an application to access a common storage (e.g., encrypted network storage 146). Applications 618 include certificate management application 124, as previously described. Furthermore, applications 618 includes any applications supporting certificate management system 114, and system 300.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by platform 606. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the platform 606, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 614 and computer-readable media 610 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 614, or combinations thereof. Platform 606 may be configured to implement particular instructions and functions corresponding to the software and hardware modules. Accordingly, implementation of a module that is executable by platform 606 as software may be achieved at least partially in hardware, e.g., through use of computer-readable storage media and hardware elements 614 of processing system 608. The instructions and functions may be executable/operable by one or more articles of manufacture (for example, processing system 608) to implement techniques, modules, and examples described herein.

Conclusion

In one or more implementations, a digital medium environment includes at least one computing device. Systems and techniques are described herein for managing and negotiating SSL certificates as part of a handshake between a client computing device and a hosting infrastructure that hosts a plurality of websites. Certificates for a website are stored in a common storage (e.g., an encrypted network storage) and are lazy-loaded into cache memory when the website is requested by a client. Certificates are served by the hosting infrastructure in response to a handshake request from a client by first determining if a certificate for a hostname in the handshake request is in cache memory. When available, a cached certificate is served. When a cached certificate for the hostname is unavailable in cache memory, a certificate is retrieved from the common storage, placed in cache memory, and served. OCSP stapling data is lazy-loaded and served also from the cache memory. Hence, a certificate is available immediately upon deployment, without costly reconfiguration of the hosting platform to accommodate new certificates and new hostnames.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to serve content to a client, a method implemented by a load balancer, the method comprising:
    receiving, by the load balancer, a handshake request from the client;
    negotiating, by the load balancer, when the handshake request does not include a hostname, a handshake with the client by sending a default certificate to the client; or
    negotiating, by the load balancer, when the handshake request does include the hostname, the handshake with the client by:
        determining, when a cached certificate for the hostname is in a cache memory, the cached certificate as a certificate to send to the client; or
        when the cached certificate for the hostname is not in the cache memory:
            obtaining an additional certificate for the hostname from a common storage, the common storage including encrypted network storage accessible by the load balancer;
            adding the additional certificate to the cache memory; and
            determining the additional certificate as the certificate to send to the client;
        determining, when cached status protocol data for the certificate to send to the client is in the cache memory, the cached status protocol data as status protocol data to send to the client; or
        when the cached status protocol data for the certificate to send to the client is not in the cache memory:
            obtaining, from an endpoint indicated by the certificate to send to the client, additional status protocol data for the certificate to send to the client;
            adding the additional status protocol data to the cache memory; and
            determining the additional status protocol data as the status protocol data to send to the client; and
        sending, to the client, the certificate to send to the client and the status protocol data to send to the client, the status protocol data to send to the client including a revocation status of the certificate to send to the client.

2. The method as described in claim 1, further comprising:
    decrypting encrypted content based on the certificate sent to the client to form decrypted content;
    analyzing the decrypted content to form analyzed content; and
    determining one or more servers from among multiple servers to serve the encrypted content to the client based on the analyzed content.

3. The method as described in claim 2, wherein the multiple servers can access the common storage.

4. The method as described in claim 1, wherein the certificate to send to the client is issued by a certificate authority other than the load balancer, the client, and an owner of a website served by the hostname.

5. The method as described in claim 1, wherein:
    the additional certificate is encrypted; and
    the sending, to the client, the certificate to send to the client includes decrypting the additional certificate to form a decrypted certificate and sending the decrypted certificate to the client.

6. The method as described in claim 1, wherein the common storage stores certificates and a respective time-to-live value for each of the certificates, and a respective certificate is removed from the common storage upon expiration of the respective time-to-live value for the respective certificate.

7. The method as described in claim 1, wherein the cache memory evicts certificates from the cache memory according to a least recently used algorithm in which least accessed certificates are evicted from the cache memory prior to other certificates.

8. The method as described in claim 1, wherein the additional certificate is provided to the common storage responsive to a request by an owner of a website served by the hostname.

9. The method as described in claim 1, wherein the load balancer is not informed when the additional certificate is provided to the common storage.

10. The method as described in claim 1, wherein, when the common storage and the cache memory do not include a certificate for the hostname, the sending, to the client, the certificate to send to the client includes sending the default certificate.

11. In a digital medium environment to serve content, a system comprising:
    an encrypted network storage;
    a cache memory;
    a handshake receiving module implemented at least partially in hardware of a load balancer to receive a handshake request from a client, the encrypted network storage being accessible by the load balancer;
    a legacy support module implemented at least partially in hardware of the load balancer to negotiate, when the handshake request does not include a hostname, a handshake with the client by sending a default certificate to the client;

a server name indication module implemented at least partially in hardware of the load balancer to negotiate, when the handshake request does include the hostname, the handshake with the client by:

determining, when a cached certificate for the hostname is in the cache memory, the cached certificate as a certificate to send to the client; or when the cached certificate for the hostname is not in the cache memory:

obtaining an additional certificate for the hostname from the encrypted network storage;

adding the additional certificate to the cache memory; and determining the additional certificate as the certificate to send to the client;

a certificate status module implemented at least partially in hardware of the load balancer to:

determine, when cached status protocol data for the certificate to send to the client is in the cache memory, the cached status protocol data as status protocol data to send to the client; and when the cached status protocol data for the certificate to send to the client is not in the cache memory:

obtain, from an endpoint indicated by the certificate to send to the client, additional status protocol data for the certificate to send to the client;

add the additional status protocol data to the cache memory; and determine the additional status protocol data as the status protocol data to send to the client; and a handshake sending module implemented at least partially in hardware of the load balancer to send, to the client, the certificate to send to the client and the status protocol data to send to the client, the status protocol data to send to the client including a revocation status of the certificate to send to the client.

12. The system as described in claim 11, further comprising:

a plurality of servers; and a content switching module implemented at least partially in hardware of the load balancer to:

decrypt encrypted content based on the certificate sent to the client to form decrypted content;

analyze the decrypted content to form analyzed content; and determine one or more servers of the plurality of servers to serve the encrypted content to the client based on the analyzed content.

13. The system as described in claim 11, wherein the handshake sending module decrypts the certificate to send to the client prior to sending the certificate.

14. The system as described in claim 11, wherein the encrypted network storage stores encrypted certificates and a respective time-to-live value for each of the encrypted certificates, and a respective encrypted certificate is removed from the encrypted network storage upon expiration of the respective time-to- live value for the respective encrypted certificate.

15. In a digital medium environment to serve content to a client, a method implemented by a load balancer, the method comprising:

a step for receiving a handshake request from the client;

a step for negotiating, when the handshake request does not include a hostname, a handshake with the client by sending a default certificate to the client; or a step for negotiating, when the handshake request does include the hostname, the handshake with the client by:

determining, when a cached certificate for the hostname is in a cache memory, the cached certificate as a certificate to send to the client; or when the cached certificate for the hostname is not in the cache memory:

obtaining an additional certificate for the hostname from a common storage, the common storage including encrypted network storage accessible by the load balancer;

adding the additional certificate to the cache memory; and determining the additional certificate as the certificate to send to the client;

determining, when cached status protocol data for the certificate to send to the client is in the cache memory, the cached status protocol data as status protocol data to send to the client; or when the cached status protocol data for the certificate to send to the client is not in the cache memory:

obtaining, from an endpoint indicated by the certificate to send to the client, additional status protocol data for the certificate to send to the client;

adding the additional status protocol data to the cache memory; and determining the additional status protocol data as the status protocol data to send to the client; and a step for sending, to the client, the certificate to send to the client and the status protocol data to send to the client, the status protocol data to send to the client including a revocation status of the certificate to send to the client.

16. The method as described in claim 15, further comprising:

a step for decrypting encrypted content based on the certificate sent to the client to form decrypted content;

a step for analyzing the decrypted content to form analyzed content; and a step for determining one or more servers of a plurality of servers to serve the encrypted content to the client based on the analyzed content.

17. The method as described in claim 16, wherein the plurality of servers can access the common storage.

18. The system as described in claim 11, wherein the certificate to send to the client is issued by a certificate authority other than the load balancer, the client, and an owner of a website served by the hostname.

19. The system as described in claim 12, wherein the plurality of servers can access the common storage.

20. The method as described in claim 15, wherein the additional certificate is provided to the common storage responsive to a request by an owner of a website served by the hostname.

* * * * *